July 30, 1957 P. ROBINSON 2,801,221
ELECTROLYTE
Filed Dec. 31, 1952
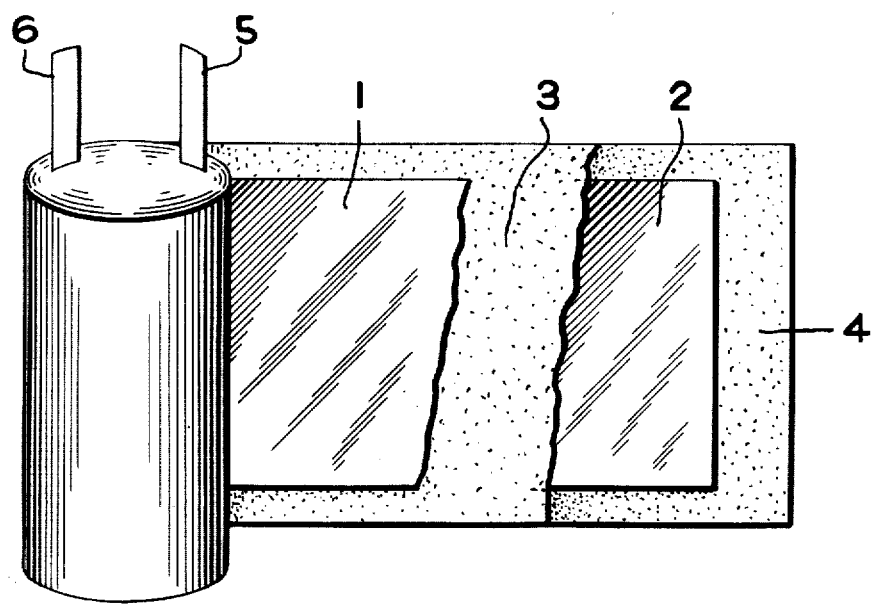
INVENTOR.
PRESTON ROBINSON
BY
Connolly and Hutz
HIS ATTORNEYS

United States Patent Office 2,801,221
Patented July 30, 1957

2,801,221

ELECTROLYTE

Preston Robinson, Williamstown, Mass., assignor to Sprague Electric Company, North Adams, Mass., a corporation of Massachusetts Application December 31, 1952, Serial No. 329,081

1 Claim. (Cl. 252—62.2)

This invention relates to new and improved low temperature electrolytes primarily designed for use in electrolytic capacitors.

An object of this disclosure is to teach those skilled in the art how to produce new and improved low temperature electrolytes which evidence superior properties over the electrolytes presently used throughout the capacitor industry. Another object of the present invention is to produce electrolytes which can be readily created by adding a single new additive to existing electrolyte compositions. A third object of the invention is to produce electrolytic capacitors having longer operating life and improved electrical characteristics under low temperature conditions. These and other objects of the invention will be apparent from the following specification and claim.

The prior art relating to the subject of electrolytic capacitors is replete with a voluminous mass of seemingly unrelated literature discussing and proposing various electrolytes for these units. The ineffectiveness of the prior work on the subject is completely evidenced by the mass of literature concerning it, and the fact that the search for new compounds and compositions for use in electrolytic capacitors has continued with undiminished vigor throughout the industry for a large number of years. If anything, the research on the subject has increased with the event of guided missiles and the like.

It has been proposed to increase the low temperature range of operation of electrolytic capacitors by adding to the electrolytes used thereto a much larger amount of salts than are presently used in such electrolytes. This expedient is neither desirable nor satisfactory, and in fact, in many cases is impossible because of lack of solubility of the solutes in the solvents employed. Other factors, such as corrosion, specific resistivity of the electrolyte at normal temperatures, and the like also are prominent in ruling out this suggestion. A number of electrolytes, especially the so-called dry electrolytes consist primarily of a solution of a boric acid derivative in a polyhydric alcohol and water, show a period prior to freezing when their conductivity drops off to a substantial extent. During this period, these electrolytes are not frozen masses, but are simply not as active as at normal temperatures. The present invention is to a large extent concerned with improving the characteristics of such electrolytes within this low temperature range prior to freezing.

It is based upon the discovery that the presence of free radicals in an electrolyte contribute greatly to the stabilization of capacitor characteristics over a wide temperature range. In its more restricted embodiments, this specification is concerned with conventional electrolytes to which have been added a high proportion, preferably within the range of from 5 to 50% by weight of the solvent, of compounds capable of forming free radicals in solution. It is to be emphasized that the invention is not limited to these specific ranges of percentages and that amounts of free radical producing compounds of from ½ to 95% by weight of the solvent in an electrolyte may be used. The precise amount and variety of electrolytes employed depends upon a number of factors, such as are specifically indicated in the subsequent discussion.

Because I do not know the precise mechanism by which the addition of free radicals to an electrolyte produces improved results over a wide range of temperatures, I do not want to be bound by any single theory of the invention. However, it presently appears to me that the improved properties obtained are the results of free radicals within the solution promoting ionization of the solutes present within these electrolytes by virtue of their high reactivity and activity within these electrolytes. The free radicals themselves are non-conductive in nature and hence, do not directly establish or aid in establishing conductivity between electrodes. They seemingly activate ions at low temperatures at which these ions otherwise would not carry a current to their normal extent. Improved properties are also thought to be a partial result of the fact that the dielectric constant of the solvent is in most cases raised by the addition of free radicals or compounds capable of forming them.

Those satisfactory free radicals for use with this invention belong to the so-called carbon, nitrogen, or sulphur types. For the purpose of deciding which radical should be used in any given application, I prefer to group the additive compounds according to whether they immediately produce stable free radicals on being placed in solution, whether they dissociate producing unstable free radicals, or whether free radicals are produced from them by either oxidation or reduction. Examples of the radicals produced from such compounds and the names of suitable compounds for use with the invention are indicated below in tabular form:

*Stable free radicals*

(1) Triarylmethyls: tri-p-biphenyl methyl; tri-p-nitrophenyl methyl; phenyl-α-napththyl-p-biphenyl methyl.

(2) Penta phenyl ethyl; 9-(triphenyl methyl)-fluoryl; phenyl di-(β,β-di-phenyl vinyl)-methyl; tri-(β,β-diphenyl vinyl)-methyl; penta phenyl cyclo penta dienyl.

(3) Aroxy radicals: 9-methoxy-10-phenantrol.

(4) Triaryl hydrazyls: α,α-biphenyl β-2,4,6-trinitro phenyl hydrazyl; α,α-di-p-anisyl-β-benzoylhydrazyl.

(5) Diaryl nitrogen oxides: 2,2',dinitrile-diphenyl nitrogen oxide.

(6) Nitrogen oxides: Nitric oxide; nitrogen peroxide.

(7) Arylthiols such as diphenylsulfide.

*Unstable free radicals (produced by oxidation or reduction)*

The solutes for use with electrolytes of the present invention cover a very wide range. In general, any known solutes presently utilized in capacitor electrolytes can be satisfactorily employed, provided that the conditions of solubility indicated below are met. Among the satisfactory inorganic electrolytes are sulfuric acid, lithium chloride, boric acid, ammonium pentaborate, and other inorganic acids, bases, and salts. Metal organic compounds, such as sodium citrate, potassium tartrate, sodium gluconate, sodium lactate, and boric, calcium, or magnesium salts of acids, such as phthalic, salicylic, gallic, etc. Organic acids, such as succinic, picric, tartalic, lactic, phthalic, and acetic. Organic bases, such as triethanol amine, phenyl hydrazine, and the like, as well as organic reaction products of these two classes or organic compounds can be satisfactorily employed as solutes. One solute which especially shows promise today is triethanol ammonium picrate.

When the free radicals to be used within a given electrolyte are produced by either oxidation or reduction, it is possible to choose appropriate inorganic salts as solvents which will accomplish the desired production of the free radicals. One such salt which is particularly suitable for such uses is ferric chloride. Others are similar salts, such as cuprous chloride, cupric chloride, the various nickel chlorides, nickel halides, and the like. Care must be taken that an electrolyte is used which is stable in the presence of the particular free radical or free radicals employed. This is quite important since the free radicals are in and of themselves quite reactive and many of the are capable of reducing certain salts. Thus, ferric chloride cannot be used with systems employing triaryl methyls, such as triphenylmethyl because it is reduced by this free radical to the ferrous salt with the production of triphenylchloromethane.

Since practically all of the free radicals and free radical producing compounds indicated above are soluble in aqueous solutions, and in most of the well-known organic solvents, such as benzene, acetone, dioxene, and carbon disulfide, carbon tetrachloride, and the lower glycols, such as ethylene glycol. Nearly any known solvent for electrolytes can be employed with the invention. Care must be taken in selecting the electrolyte that all of the components are soluble therein to the desired extent.

The usual or slightly higher ratios of solute to solvent utilized with electrolytic capacitors are employed with the present invention. Those skilled in the art will be able to determine the precise quantities of the various ingredients required for any given application with a minimum of experimentation.

To illustrate a number of electrolytes falling within the scope of the present disclosure, the following compositions were used to impregnate an electrolytic capacitor utilizing a 3 mil aluminum anode 2¼ inches wide consisting of etched foil which had been formed to 650 v. in boric acid and having an area of 20 square inches. An unetched aluminum cathode of the same size was separated from this anode by a 5 mil fiber glass spacer. In all cases, conventional vacuum impregnating techniques were used at the indicated temperatures:

1. The capacitor was vacuum impregnated at 25° C. with an electrolyte consisting of 2% triethanol ammonium picrate, 2% of tri-p-biphenyl methyl (Muller et al., App. 520,235 (1935)) and 96% of dimethyl formamide.

2. The capacitor structure was vacuum impregnated at 25° C. with an electrolyte consisting of 7% ammonium pentaborate, 2% $\alpha,\alpha$ - biphenyl - $\beta$ - 2,4,6 - trinitrophenyl hydrazyl (Goldschmidt et al. Berichte 55, 628–643 (see pages 638 and 639 (1922)) and 90% triethylene glycol.

3. The capacitor structure was impregnated at 25° C. with an electrolyte consisting of 10% sodium tartrate, 2% pentaphenyl ethyl (Schlink and Mark. Ber. 55, 2285 (1922)), and 88% of water.

4. The capacitor structure was vacuum impregnated at 25° C. with an electrolyte consisting of 3% triethanol amine, 5% benzil and 92% triethylene glycol.

5. The capacitor was vacuum impregnated at 50° C. with an electrolyte consisting of 3% butyric acid, 10% p-phenylene diamine, and 87% butyro nitrile.

6. The capacitor structure was vacuum impregnated at 25° C. with 10% of ammonium chloride, 10% of tri-p-biphenyl methyl and 80% of dimethyl formamide.

The appended drawing represents in cross-section a capacitor containing the electrolyte of the invention. In the drawing, 1 represents an etched aluminum anode, and 2 represents an unetched aluminum cathode of the same size; 3 and 4 represent fiberglas spacers impregnated with an electrolyte containing free radicals in the desirable solvent. Terminal tabs 5 and 6 are connected to the electrodes in the usual manner.

As many apparently widely different embodiments of my invention may be made without departing from the spirit and scope hereof, it is to be understood that my invention is not limited to the specific embodiments hereof except as defined in the appended claim.

What is claimed is:

An electrolytic capacitor electrolyte consisting essentially of 2% triethanol ammonium picrate, 2% tri-p-biphenyl methyl, and 96% dimethyl formamide.

References Cited in the file of this patent

UNITED STATES PATENTS 2,224,150     Fruth                Dec. 10, 1940

U. S. DEPARTMENT OF COMMERCE
PATENT OFFICE

CERTIFICATE OF CORRECTION

Patent No. 2,801,221                                                          July 30, 1957

Preston Robinson

It is hereby certified that error appears in the printed specification of the above numbered patent requiring correction and that the said Letters Patent should read as corrected below.

Column 2, line 39, for "napththyl" read -- naphthyl --; column 4, line 2, for "App. 520,235" read -- Ann 520, 235 --; line 7, for "Berichte 55, 628-643" read -- Berichte 55, 628-643 --; line 11, for "Ber. 55, 2285" read -- Ber. 55, 2285 --.

Signed and sealed this 25th day of March 1958.

(SEAL)
Attest:

KARL H. AXLINE
Attesting Officer

ROBERT C. WATSON
Commissioner of Patents